United States Patent
MacRae et al.

(10) Patent No.: US 6,884,385 B2
(45) Date of Patent: Apr. 26, 2005

(54) COLORIZATION PELLET FOR INJECTION MOLDING PROCESS

(75) Inventors: Robert A MacRae, Lapeer, MI (US); Sammy D. Shepherd, Mt. Pleasent, TN (US); Ryan M Deboer, Franklin, TN (US)

(73) Assignee: General Motors Corporation, Detroit, MI (US)

( * ) Notice: Subject to any disclaimer, the term of this patent is extended or adjusted under 35 U.S.C. 154(b) by 68 days.

(21) Appl. No.: 10/438,771

(22) Filed: May 15, 2003

(65) Prior Publication Data

US 2004/0229037 A1 Nov. 18, 2004

(51) Int. Cl.⁷ .............................................. C04B 35/622
(52) U.S. Cl. ...................... 264/645; 264/1.34; 264/1.9; 264/109; 264/110; 264/257
(58) Field of Search ................................ 264/1.34, 1.9, 264/109, 110, 257, 645, 464, 477, 478, 122

(56) References Cited

U.S. PATENT DOCUMENTS

| | | | | |
|---|---|---|---|---|
| 3,843,571 A | * | 10/1974 | Fitzgerald | 523/220 |
| 5,008,143 A | * | 4/1991 | Armanini | 428/207 |
| 5,177,124 A | * | 1/1993 | Questel et al. | 523/219 |
| 5,733,659 A | * | 3/1998 | Iwakiri et al. | 428/412 |
| 5,814,686 A | * | 9/1998 | Micale et al. | 523/205 |
| 5,856,378 A | * | 1/1999 | Ring et al. | 523/205 |
| 6,077,575 A | * | 6/2000 | Minghetti | 428/15 |
| 6,164,034 A | * | 12/2000 | Roetheli et al. | 52/560 |
| 6,280,937 B1 | * | 8/2001 | Luo et al. | 435/6 |
| 6,503,614 B1 | * | 1/2003 | Gueret | 428/297.4 |

* cited by examiner

Primary Examiner—H. Thi Le
(74) Attorney, Agent, or Firm—Laura C. Hargitt

(57) ABSTRACT

A colorization pellet includes a pellet body formed of a material having a predetermined color and a plurality of fibers in the pellet body. A plurality of reflective devices are attached to the fibers whereby when the colorization pellet is combined with a plastic molding compound during an injection molding process to form a part, the formed part has a metallic appearance.

3 Claims, 2 Drawing Sheets

COLORIZATION PELLET FOR INJECTION MOLDING PROCESS

BACKGROUND OF THE INVENTION

The present invention relates generally to injection molding materials and processes and, in particular, to a colorization pellet for use in an injection molding process.

Injection molding materials and processes are well known. In an injection molding operation, extruders are utilized for transforming solid materials into a molten mixture for subsequent use in a mold or die via injection. The extruder typically includes an extruder screw disposed therein. Materials that are used for this purpose include a range of plastic materials, as well as various metal or thixotropic materials. The injection molding process includes feeding the solid material in pellet, chip, powder, or flake form to the feed end of the extruder through a hopper or similar device mounted on an opening of a heated cylindrical barrel. The solid material fed into the screw channel is compacted into a solid plug or solid bed and the solid bed melts as it travels down the screw channel. The molten material is then provided to an injection molding machine for forming a part or the like. When the part is formed, defects from the mold known as flow and knit lines are visible in the exterior surface of the part.

It has become more common recently for metallic parts, such as automobile body parts, to be coated on exterior surfaces thereof with paint coatings having a reflective or metallic finish. These paint coatings typically include a plurality of reflective or metallic ingredients disposed therein, such as aluminum flake, coated mica flake, reflective glass beads, reflective glass flake, or holograms. It has also become more common, however, for the exterior of the automobile body to include parts manufactured of injection-molded plastic or other non-metallic material, which present further problems in providing a uniform appearance for the surface of the vehicle. The injection molded parts have been coated in the prior art utilizing a variety of methods including coating the plastic components with a metallic or reflective paint of either low gloss or high gloss. Painting the injection molded part, however, is disadvantageously expensive and time-consuming.

Alternatively, a paint film or a polymer film is applied to the exterior surface of the injection molded part. The paint films or polymer films, however, also have a high associated cost as well as technical challenges including, but not limited to, tooling, draw limitation, graining, trimming, and gloss challenges. Applying the paint film or polymer film to the part is also time-consuming.

A more desirable alternative is to form the part from a plastic material having both the desired color and the desired metallic appearance characteristics so that the part may be installed after being formed without having to be subsequently painted. This alternative, however, has proved to be difficult because the flow and knit lines in the exterior surface of the part are vastly more apparent when the reflective or metallic ingredients, such as those in the metallic paint noted above, are intermixed with the plastic material prior to the extrusion portion of the injection molding operation. The reflective or metallic ingredients disadvantageously tend to orient along the flow and knit lines and do not provide a clean or uniform appearance in the exterior surface of the part.

It is desirable, therefore, to provide a material for use in an injection molding process that will advantageously aid in providing a metallic appearance in the exterior surface of an injection molded part without the need for subsequent painting after the part has been formed.

SUMMARY OF THE INVENTION

The present invention concerns a colorization pellet for use in a plastic injection molding process. The colorization pellet includes a pellet body formed of a material having a predetermined color and a plurality of fibers in the pellet body. A plurality of reflective devices are attached to the fibers whereby when the colorization pellet is combined with a plastic molding compound during an injection molding process to form a part, the formed part has a metallic appearance.

Preferably, the pellet body is formed of a plastic material including, but not limited to, polyvinylchloride (PVC), polypropylene, or the like. Preferably, the fibers are formed of a polymeric inorganic material, such as carbon fibers, rayon, or the like. The fibers function as a carrier for the reflective devices. Preferably, the reflective devices are formed from one of, but are not limited to, aluminum, coated mica, reflective glass bead, reflective glass flake, or hologram. The reflective devices are chemically or physically bonded to the fibers.

A method according to the present invention may be practiced by providing a filament; colorizing the filament; attaching a plurality of reflective devices to the filament; separating the filament into a plurality of fibers having the reflective devices attached thereto; adding a color concentrate material to a compounding extruder; adding the fibers to the compounding extruder; and operating the compounding extruder to mix the fibers with the color concentrate material and form a plurality of colorization pellets.

Reflective yarns or threads are well known and are produced in a spool form for use in the apparel industry for design and safety reasons. The reflective yarns or threads are produced in a wide variety of colors and consist of a reflective glass bead chemically adhered to the yarn or thread surface. In addition, fibers formed from polymeric inorganic materials have been intermixed with plastic material to produce plastic components having a speckled or granite-like appearance in injection molded parts. The fiber's composition and visual size distribution promote a clean appearance that is free of the flow and knit line defects noted above. The present invention, utilizing the reflective devices attached to the fibers as outlined above, will also produce an injection molded part having a clean appearance that is free from the flow and knit line appearance defects noted above. The colorization pellet according to the present invention can be utilized to form parts having medium and lighter color values for both interior and exterior applications. The present invention provides injection molded parts having a metallic appearance and is a lower cost alternative to reflective or metallic paint coatings, paint films, and polymer films.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
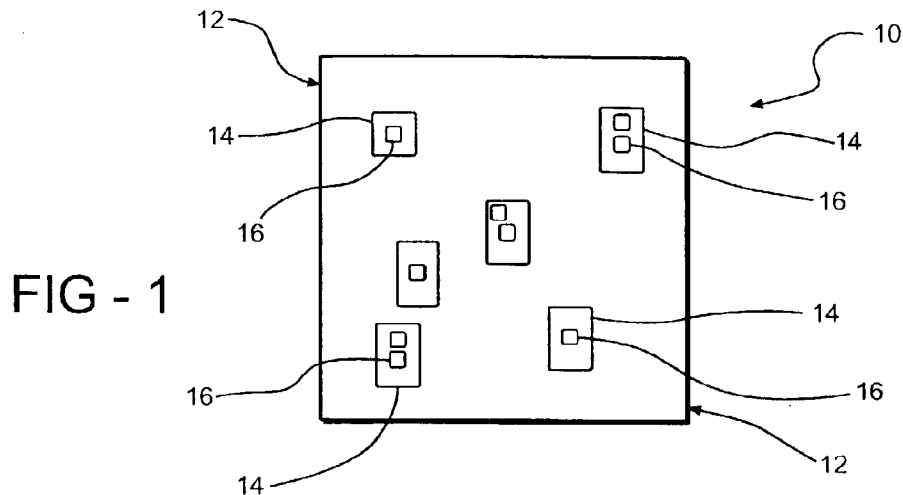
FIG. 1 is a schematic view of a colorization pellet in accordance with the present invention.

Referring now to FIG. 1, a colorization pellet in accordance with the present invention for use in an injection molding process is indicated generally at 10. The pellet 10 includes a pellet body 12 having a plurality of fibers 14 disposed therein. The pellet body 12 is formed of a material having a predetermined color for forming an injection molded part (not shown) of the predetermined color in an injection molding process, discussed in more detail below. Preferably, the material of the pellet body 12 is formed from a plastic material, such as, but not limited to, polyvinyl chloride (PVC) or the like. Preferably, the fibers 14 are formed from a polymeric inorganic material, such as, but not limited to, carbon fibers, rayon, or the like.

A plurality of reflective devices 16 is attached to the fibers 14. The reflective devices 16 can include, but are not limited to, at least one of aluminum particles, coated mica particles, reflective glass beads, reflective glass flakes and holographic particles. Preferably, the reflective devices 16 are chemically or physically bonded to the fibers 14. The fibers 14 act as a carrier for the reflective devices 16 during an extrusion process and in an injection molding process, outlined in more detail below. When a plurality of the colorization pellets 10 is combined with a plastic molding compound during the injection molding process to form a part, discussed in more detail below, the formed part has a metallic appearance. Alternatively, the fibers 14 have the same predetermined color as the material of the pellet body 12. Alternatively, the fibers 14 have a predetermined color different than the predetermined color of the material of the pellet body 12.

Figure 2:
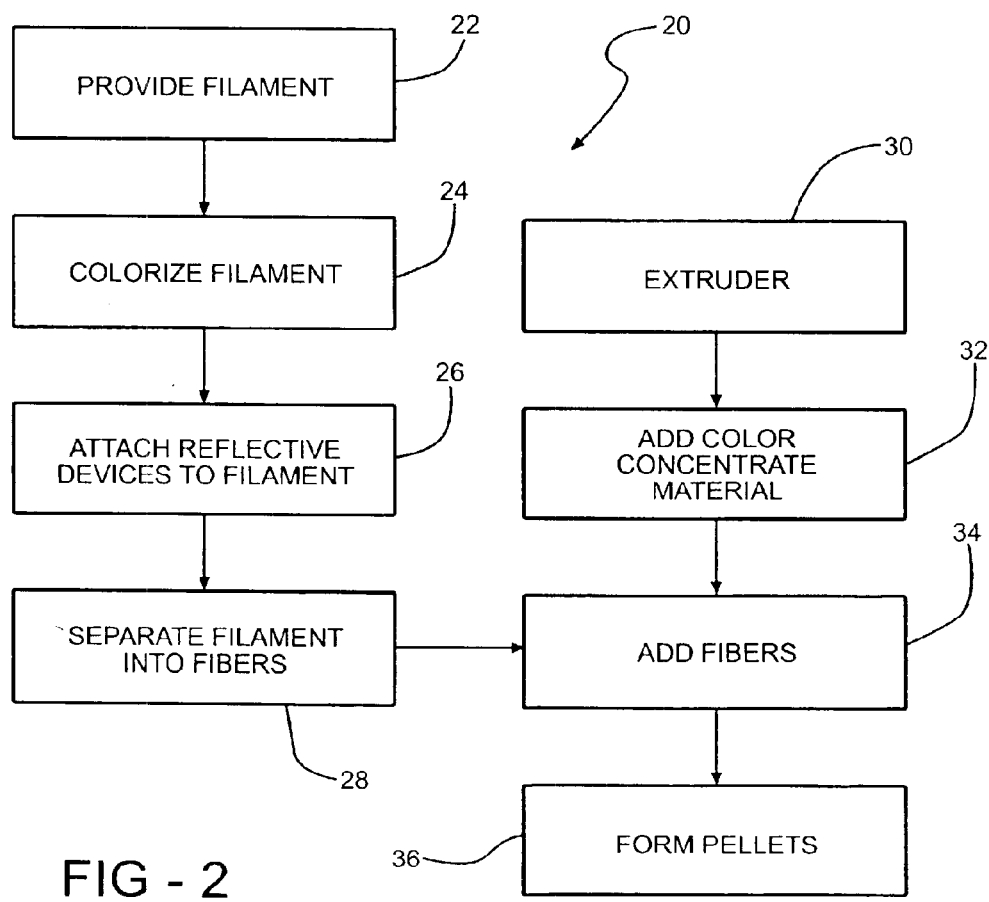
FIG. 2 is a flowchart of a method for producing the colorization pellet of FIG. 1 in accordance with the present invention.

Referring now to FIG. 2, a flowchart of a method of producing the colorization pellet 10 in accordance with the present invention is indicated generally at 20. The method 20 includes a step 22 of providing at least one, and preferably a plurality of filaments. The filament or filaments are preferably formed of a polymeric inorganic material such as carbon fibers, rayon, or the like. The filaments in the step 22 are then colorized in a step 24, preferably by compounding or a similar process. After the filaments have been colorized in the step 24, a plurality of reflective devices, such as the reflective devices 16 of FIG. 1, are attached to the filaments in a step 26. After the reflective devices are attached to the filaments in the step 26, the filaments are separated into fibers, such as the fibers 14 shown in FIG. 1. The fibers 14 now have the reflective devices 16 attached thereto.

Prior to, concurrently with, or after the filaments have been separated into fibers in the step 28, an extruder is provided in a step 30. A color concentrate material is added to the extruder in a step 32. The color concentrate material is a predetermined color. The fibers from the step 28 are added to the extruder and the color concentrate material in a step 34. After the fibers and the color concentrate have been added to the extruder, the extruder is operated and forms a plurality of pellets, such as the pellets 10 of FIG. 1, in a step 36. The pellets 10 now include a plurality of fibers 14 disposed therein having reflective devices 16 attached thereto and is formed of a predetermined color from the color concentrate material.

Figure 3:
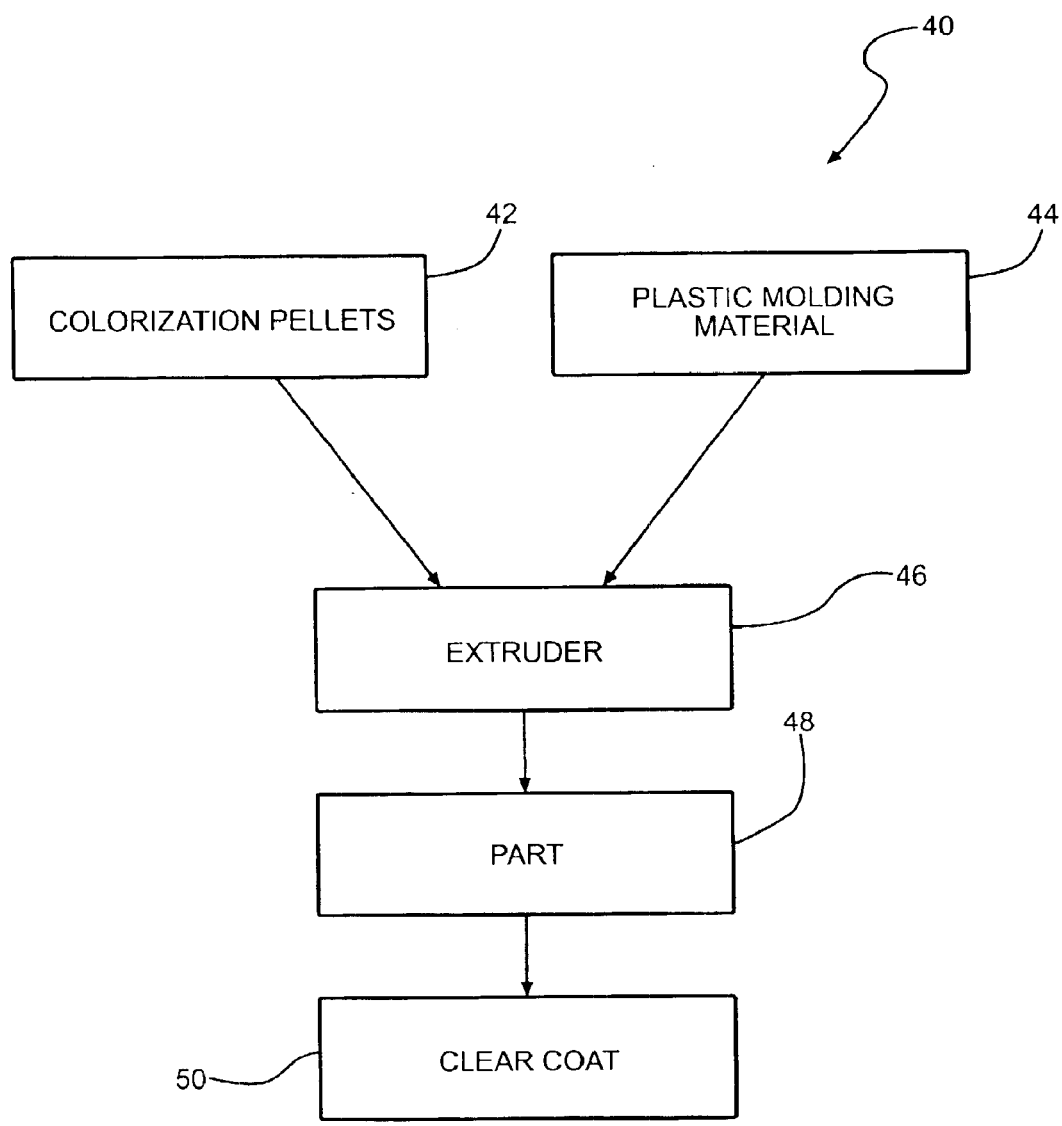
FIG. 3 is a flowchart of a method for producing an injection molded part in accordance with the present invention utilizing the colorization pellet of FIG. 1.

Referring now to FIG. 3, a flowchart of a method of producing an injection molded part in accordance with the present invention utilizing the colorization pellet 10 is indicated generally at 40. In a step 42, colorization pellets, such as the pellet 10 formed in the step 36 are provided. In a step 44, a plastic molding material is provided. The plastic molding material is preferably a PVC material similar to the material of the pellet body 12 that is not formed of a predetermined color, or is an uncolored material. In a step 46, the colorization pellets 10 from the step 42 and the plastic molding material from the step 44 are provided to an extruder. Preferably, the colorization pellets 10 comprise around 4% of the total material provided to the extruder and the plastic molding material comprises around 96% of the material provided to the extruder. The exact proportions of the colorization pellets 10 and the plastic molding material provided to the extruder, however, are not critical to the invention, and those skilled in the art will appreciate that the colorization pellets 10 and the plastic molding material may be provided to the extruder in any number of proportions.

After the colorization pellets and the plastic molding material are provided to the extruder in the step 46, the extruder is operated, which melts the colorization pellets 10 and the plastic molding material into a substantially homogeneous molten mixture (not shown). The molten mixture is then utilized in an injection molding process to form an injection molded part in a step 48. The injection molded part formed in the step 48 has utilized the colorization pellets 10 formed in the step 36 and, therefore, includes a plurality of reflective devices 16 and fibers 14 disposed therein. The reflective devices 16 in the material of the injection molded part formed in the step 48 advantageously provide a metallic appearance on an exterior surface of the part. The part formed in the step 48 is advantageously the same color throughout, which allows the part to be repaired of minor damage, such as scratches or the like, by providing a small amount of heated material to the damaged portion of the part, rather than requiring the entire part to be repainted or replaced. Alternatively, the exterior surface of the part formed in the step 48 is coated in a step 50 in a clear coat process to provide further reflectivity for the part.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for producing a plastic component having a metallic appearance by injection molding comprising the steps of:

a) providing a plurality of colorization pellets to an injection molding extruder, the pellets being formed of a colored material and a plurality of fibers each having reflective devices attached thereto;

b) providing a plastic molding material to the extruder;

c) operating the extruder to mix the colored material, the fibers and the plastic molding material together into a molding compound; and d) forming the molding compound into plastic components each having a metallic appearance.

2. The method according to claim 1 including a step e) of providing a clear coat to an exterior surface of the plastic component.

3. The method according to claim 1 wherein the reflective devices in the step a) are at least one of aluminum particles, coated mica particles, reflective glass beads, and reflective glass flakes.

* * * * *